United States Patent
Costa et al.

(10) Patent No.: US 9,854,254 B2
(45) Date of Patent: Dec. 26, 2017

(54) METHOD AND SYSTEM FOR REMOTE VIEWING OF STATIC AND VIDEO IMAGES

(75) Inventors: Mario Costa, Davie, FL (US); G. Richard Goodley, II, Pompano Beach, FL (US); Craig S. Siegman, Pembroke Pines, FL (US); Gamma O. Dean, Fort Lauderdale, FL (US); John M. Phillips, Pompano Beach, FL (US)

(73) Assignee: AVOCENT CORPORATION, Huntsville, AL (US)

( * ) Notice: Subject to any disclaimer, the term of this patent is extended or adjusted under 35 U.S.C. 154(b) by 2174 days.

(21) Appl. No.: 12/535,495

(22) Filed: Aug. 4, 2009

(65) Prior Publication Data

US 2011/0032982 A1 Feb. 10, 2011

(51) Int. Cl.
| | |
|---|---|
| H04N 7/26 | (2006.01) |
| H04N 19/179 | (2014.01) |
| H04N 19/172 | (2014.01) |
| H04N 19/61 | (2014.01) |
| H04N 19/60 | (2014.01) |
| H04N 19/12 | (2014.01) |
| H04N 19/137 | (2014.01) |
| H04N 19/162 | (2014.01) |

(52) U.S. Cl.
CPC ........... *H04N 19/179* (2014.11); *H04N 19/12* (2014.11); *H04N 19/137* (2014.11); *H04N 19/162* (2014.11); *H04N 19/172* (2014.11); *H04N 19/60* (2014.11); *H04N 19/61* (2014.11)

(58) Field of Classification Search
CPC ...... H04N 7/50; H04N 7/26244; H04N 7/462; H04N 7/26031

USPC ........... 375/240.02, 240.16, 240.12, 240.15, 375/240.14, 240.13; 382/236, 239, 238, 382/232

See application file for complete search history.

(56) References Cited

U.S. PATENT DOCUMENTS

| | | | |
|---|---|---|---|
| 5,493,638 A | | 2/1996 | Hooper et al. |
| 6,073,192 A | * | 6/2000 | Clapp et al. ..................... 710/65 |

(Continued)

FOREIGN PATENT DOCUMENTS

| | | |
|---|---|---|
| EP | 1467562 | 10/2004 |
| WO | WO2007024458 A2 | 3/2007 |
| WO | WO2007024458 A3 | 3/2007 |

OTHER PUBLICATIONS

International Search Report and Written Opinion dated Sep. 1, 2010 in PCT Appln. No. PCT/US2010/001714.

(Continued)

*Primary Examiner* — Shawn An
(74) *Attorney, Agent, or Firm* — Davidson Berquist Jackson & Growdey, LLP (57) ABSTRACT

Methods and systems are provided that allow a user to remotely access another computer and view its desktop without regard to whether that desktop has a relatively static image typical of a computer desktop, or whether it is playing a video, such as from a DVD. Relatively static screens may be displayed along with full motion video in such systems. These systems may also provide for both short mouse lag time when full motion video is displayed. In one implementation, hardware and firmware captures and encodes the video from the remote computer, and software on the client computer decodes the encoded video and displays it to the user.

21 Claims, 5 Drawing Sheets

(56) References Cited

U.S. PATENT DOCUMENTS

| | | | |
|---|---|---|---|
| 6,262,771 B1* | 7/2001 | Higurashi | H04N 9/8042 348/428.1 |
| 6,377,625 B1* | 4/2002 | Kim | 375/240.08 |
| 6,381,360 B1 | 4/2002 | Sogawa | |
| 6,483,875 B1* | 11/2002 | Hasebe et al. | 375/240.15 |
| 7,068,266 B1* | 6/2006 | Ruelle | 345/418 |
| 7,587,738 B2* | 9/2009 | Nakamura et al. | 725/105 |
| 7,756,360 B2* | 7/2010 | Ishii et al. | 382/298 |
| 7,836,193 B2* | 11/2010 | Ducharme | 709/231 |
| 2003/0151672 A1* | 8/2003 | Robins | G08B 13/19663 348/208.6 |
| 2003/0177500 A1 | 9/2003 | Nakamura | |
| 2004/0151390 A1* | 8/2004 | Iwamura | G06F 3/1462 382/236 |
| 2008/0181507 A1* | 7/2008 | Gope | H04N 5/144 382/190 |
| 2009/0153585 A1 | 6/2009 | Mahajan et al. | |
| 2011/0018738 A1* | 1/2011 | Feroldi | B60Q 1/503 340/905 |

OTHER PUBLICATIONS

Preliminary Report on Patentability dated Feb. 16, 2012 in PCT/US2010/001714.
EP 10806731.5—Extended Search Report dated Dec. 16, 2015.
CN Appln. No. 201080025717.1—Office Action dated Sep. 4, 2014.

* cited by examiner

METHOD AND SYSTEM FOR REMOTE VIEWING OF STATIC AND VIDEO IMAGES

This generally relates to remote viewing of images, and more particularly to simultaneous remote desktop viewing of static and moving images such as video in a client server environment.

BACKGROUND

Systems exist to facilitate remote control of and access to a computer by an operator at a remote station. Such systems typically use a device or mechanism that enables an operator at a remote station to control aspects of a so-called target (or local) computer. More particularly, such systems typically allow a remote station to provide mouse and keyboard input to the target computer and further allow the remote station to view the video display output. These types of systems are typically called keyboard-video-mouse (KVM) systems.

Systems such as these allow a user to remotely access another computer and view its desktop when the desktop has a relatively static image typical of a computer desktop. However, when the desktop is playing a video, such as from a DVD, image quality, transmission and display suffers. Conventional KVM systems typically display relatively static remote computer desktops well. However, when motion video is displayed on the remote desktop, the Dambrackas Video Compression (DVC) scheme used in such systems does not encode the video well, and thus the displayed video does not appear with the same amount of motion as is appearing on the remote desktop.

In addition to the motion video not being displayed at its full frame rate, there is a noticeable degradation of performance in lag time of the mouse. Typically, with a relatively static screen, mouse lag time is short and acceptable. However, with full motion video, the mouse lag time can be long and can significant decrease the usefulness of the remote desktop to the user.

Conventional systems are not optimized to view motion video on a remote desktop system and do not efficiently display both static images and moving images together. Accordingly, there is a desire for a system to provide efficient remote viewing of both static and full motion video images, while reducing and mouse lag time.

SUMMARY

In accordance with methods and systems consistent with the present invention, a data processing system for remote viewing of still and motion images is provided comprising a screen displaying images, and a memory configured to store a motion threshold used to determine whether an image on the screen is a still image or a motion image. The data processing system also comprises a processor configured to monitor the images displayed on the screen, and determine whether one or more of the images displayed on the screen are moving more than the motion threshold. It further comprises a motion video encoder configured to encode images on the screen that are moving more than the motion threshold, and a still image encoder configured to encode images on the screen that are moving less than the motion threshold.

In accordance with another implementation, a method in a data processing system for remote viewing of still images and motion images is provided comprising displaying a screen having images, and storing a motion threshold used to determine whether an image on the screen is a still image or a motion image. The method also comprises monitoring the images displayed on the screen, and determining whether one or more of the images displayed on the screen are moving more than the motion threshold. Finally, the method also comprises encoding images on the screen that are moving more than the motion threshold with a motion image encoder, and encoding images on the screen that are not moving less than the motion threshold with a still image encoder.

In yet another implementation, a method in a data processing system for remote viewing of still images and motion images is provided comprising receiving images to be displayed on a screen encoded with a motion video encoder, wherein the images are moving more than a motion threshold, and decoding the motion video encoded images with a motion video decoder. The method further comprises receiving images to be displayed on the screen encoded with a still image encoder, wherein the images are moving less than a motion threshold, and decoding the still image encoded images with a still image decoder. The method also comprises displaying the decoded motion video images and the decoded still images on the screen, and sending control signals to a target computer to control the target computer.

DETAILED DESCRIPTION

Methods and systems in accordance with the present invention allow a user to remotely access another computer and view its desktop without regard to whether that desktop has a relatively static image typical of a computer desktop, or whether it is playing a video, such as from a DVD. Relatively static screens may be displayed along with full motion video in such systems. Methods and systems consistent with the present invention may also provide for both short mouse lag time when full motion video is displayed. In one implementation, hardware and firmware captures and encodes the video from the remote computer, and software on the client computer decodes the encoded video and displays it to the user.

The hardware and firmware capturing and compressing the video recognizes when a rectangular area of the screen exceeds a motion threshold, which may be set by the user. At that point, the system defines a "motion window." Within the motion window, a motion video encoder, such as an MPEG encoder, encodes the motion video. Outside of the motion window, an encoder more suitable for still images, such as a DVC encoder, encodes the relatively static video, specifically avoiding encoding the motion window area. The encoder may be any suitable encoder including any remote desktop encoder such as a Remote Desktop Protocol (RDP) encoder or a Virtual Network Computing (VNC) encoder. When the motion inside the motion window falls below the motion threshold, the motion window area reverts to relatively static video images. In this way, both relatively static video on the remote desktop co-exists with motion video, with acceptable mouse lag time.

In one implementation, these solutions combine lossless compression for relatively static images, such as DVC, and lossy compression, such as MPEG-4, for regions of the remote desktop. The lossless function of the DVC encoders for the static images of the screen provides for improved mouse lag timing.

In the discussion that follows, the computer or system being controlled or accessed is generally referred to as the target computer or the target system. In some instances, the target computer is also referred to as the local computer. The system that is being used to access or control the target (local) computer is generally referred to herein as the client system. For convenience of description, components on or connected directly to the target computer are referred to herein as "local," whereas components that are on or connected directly to the client system are referred to herein as "client."

Figure 1:
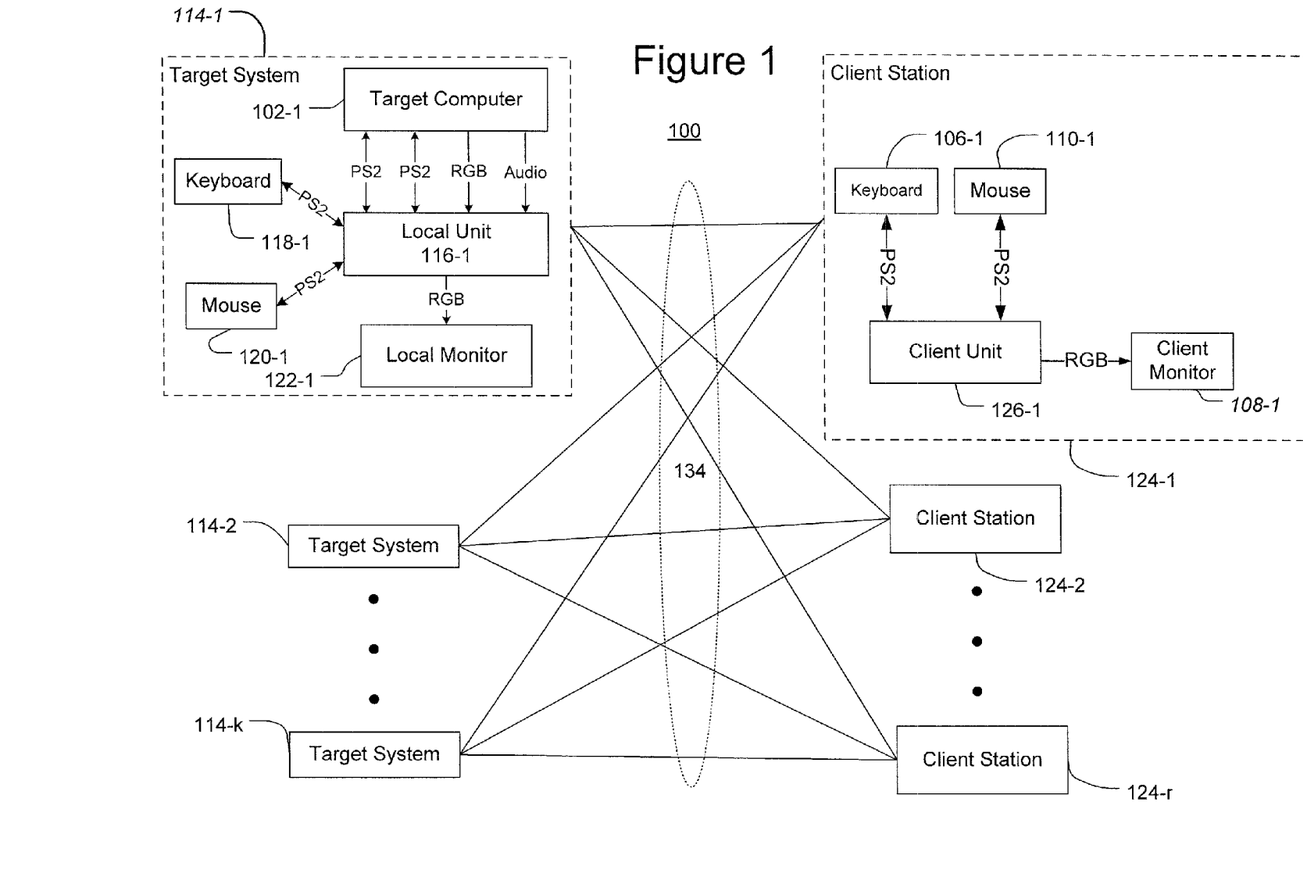
FIG. 1 illustrates depicts an exemplary KVM computer system network in accordance methods and systems consistent with the present invention

FIG. 1 illustrates depicts an exemplary KVM computer system in accordance methods and systems consistent with the present invention. A KVM system 100 is shown in FIG. 1, where one or more target systems 114-1 . . . 114-*k* are controlled or accessed by one or more client stations 124-1, 124-2, . . . , 124-*r* (generally 124). Each target system 114 includes a target computer 102 with associated and attached local unit 116. Each client station 124 generally includes a client unit 126, a keyboard 106, a video monitor 108 and a mouse (or similar point-and-click device) 110, although some client stations may only include a video display 108 and a client unit. Operation of a particular target computer 102-*i* may be remotely viewed on the video monitor 108 of any of the client stations 124, and the keyboard 106 and mouse 110 of the client station 124 may be used to provide keyboard and mouse input to the target computer 102-*i*. As shown in FIG. 1, in a KVM system 100, a client station 124 is able to control or access more than one target computer. Note that the lines drawn between target systems and client stations in FIG. 1 represent potential (and not necessarily actual) wired or wireless (e.g., RF) links between those sides. Thus, each target computer 102 may be controlled or accessed by more than one client station 124, and each client station 124 may control more than one target computer 102. The client station 124, in one implementation, may be located within several hundred feet of the target system.

Furthermore, in certain contexts, the target system 114 is considered to be a video transmitter or sending unit, and the client system 124 is the video receiving unit or receiver, although both units transmit and receive. Generally, video travels from target system 114 to client station 124, while keyboard and mouse data move from client station to target system.

As shown in FIG. 1 the local or target system 114 includes a target computer 102 and an associated local unit 116. The local system 114 may also include a keyboard 118, a mouse (or other point-and-click-type device) 120 and a local monitor 122, each connected to the local unit 116 directly. The client station 124 includes a client unit 126. The local or target computer 102 may be a computer, a server, a processor or other collection of processors or logic elements. Generally, a target computer 102 may include any processor or collection of processors. By way of example, a target computer 102 may be a processor or collection of processors or logic elements located (or embedded) in a server, a desktop computer (such as a PC, Apple Macintosh or the like), a kiosk, an ATM, a switch, a set-top box, an appliance (such as a television, DVR, DVD player and the like), a vehicle, an elevator, on a manufacturing or processing production line. A collection of target computers 102 may, e.g., be a collection of servers in a rack or some other collection, they may be independent of each other or connected to each other in a network or by some other structure. The local and client monitors 122, 108, may be digital or analog.

The local unit 116 is a device or mechanism, e.g., a printed circuit board ("PCB"), that is installed locally to the target/local computer 102. This device may be close to, but external to the computer, or may be installed inside the computer's housing. Regardless of the positioning of the local unit 116, in one implementation, there is a direct electrical connection between the target computer 102 and the local unit 116.

Various components on the local/target system 114 communicate wirelessly or via a wired connection with components on the client station 124 via a wireless connection link 134. In one implementation, the wireless connection or link 134 follows the IEEE 802.11a standard protocol, although one skilled in the art will realize that other protocols and methods of communication are possible.

The local unit 116 receives local mouse and keyboard signals, e.g., as PS2 signals. These signals are provided by the local unit 116 to the target computer 102. The target computer 102 generates video output signals, e.g., RGB (Red, Green, Blue) signals, which are provided to the local unit 116 which, in turn, provides the signals to drive the local monitor 122. The target computer 102 may also generate audio output signals which are provided to the local unit 116. As noted, the target computer 102 need not have a keyboard, mouse or monitor, and may be controlled entirely by a client station 124.

Local unit 116 transmits image data for transmission to a client station (e.g., via client unit 126). Some or all of the data may be compressed before being transmitted. Additionally, local unit 116 may receive mouse and keyboard data (from a client station 124), which is then provided to the local/target computer 102. The target computer 102 may execute the data received and may display output on its local monitor 122.

The client station 124 receives video data from the local unit 116 of the target computer 102, via a wired or wireless connection (e.g., 802.11a wireless connection 134). The client unit 126 receives (possibly compressed) video from the local unit 116. The client unit 126 decompresses (as necessary) the video data from the local unit 116 and provides it to the appropriate rendering device, e.g., to the client monitor 108, which displays the video data, and to the client speakers 109, respectively. Additionally, client mouse 110 and keyboard 106 may be used to generate appropriate signals (e.g., PS2 signals) that may be transmitted via client unit 126 to local unit 116 for execution on target computer 102.

Figure 2:
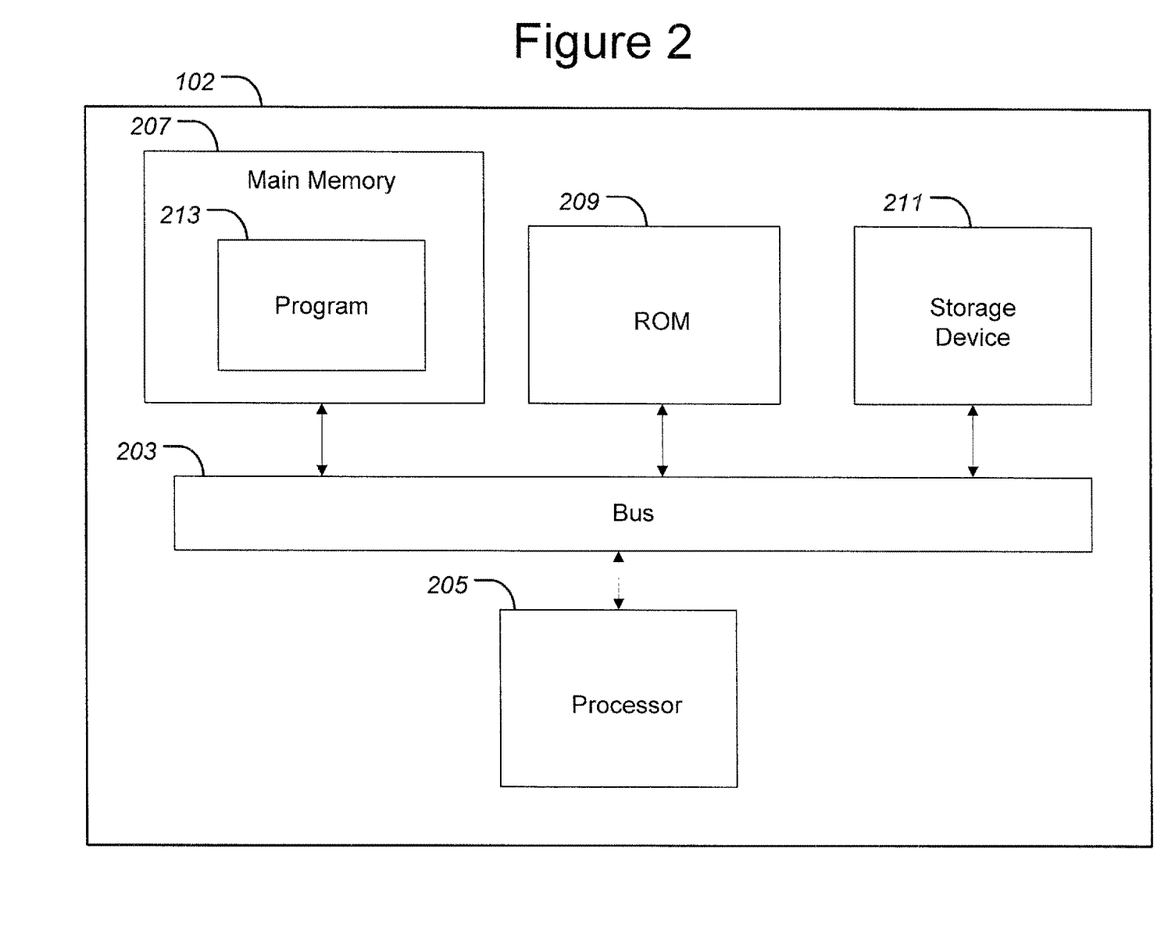
FIG. 2 illustrates an exemplary computer system consistent with systems and methods consistent with the present invention.

FIG. 2 illustrates an exemplary target computer system consistent with systems and methods consistent with the present invention. Target computer 102 includes a bus 203 or other communication mechanism for communicating information, and a processor 205 coupled with bus 203 for processing the information. Client station 124 may also include similar components as target computer 102, including some or all of the components mentioned. Target computer 102 also includes a main memory 207, such as a random access memory (RAM) or other dynamic storage device, coupled to bus 203 for storing information and instructions to be executed by processor 205. In addition, main memory 207 may be used for storing temporary variables or other intermediate information during execution of instructions to be executed by processor 205. Main memory 207 includes a program 213 for implementing processing consistent with methods and systems in accordance with the present invention. Video encoders and related firmware may be implemented in a video board, separate video controller, video application-specific integrated circuit (ASIC) or other hardware component. Alternatively, main memory 207 on client station 124 may also store MPEG encoders, DVC encoders or any other suitable encoders for encoding the relatively still and full motion video. The memory of client computer 124 may include still image and video decoders, e.g., DVC decoders and MPEG decoders. Target computer 102 further includes a Read-Only Memory (ROM) 209 or other static storage device coupled to bus 203 for storing static information and instructions for processor 205. A storage device 211, such as a magnetic disk or optical disk, is provided and coupled to bus 203 for storing information and instructions.

According to one embodiment, processor 205 executes one or more sequences of one or more instructions contained in main memory 207. Such instructions may be read into main memory 207 from another computer-readable medium, such as storage device 211. Execution of the sequences of instructions in main memory 207 causes processor 205 to perform processes described herein. One or more processors in a multi-processing arrangement may also be employed to execute the sequences of instructions contained in main memory 207. In alternative embodiments, hard-wired circuitry may be used in place of or in combination with software instructions. Thus, embodiments are not limited to any specific combination of hardware circuitry and software.

Although described relative to main memory 207 and storage device 211, instructions and other aspects of methods and systems consistent with the present invention may reside on another computer-readable medium, such as a floppy disk, a flexible disk, hard disk, magnetic tape, a CD-ROM, magnetic, optical or physical medium, a RAM, a PROM, and EPROM, a FLASH-EPROM, any other memory chip or cartridge, or any other medium from which a computer can read, either now known or later discovered.

Figure 3:
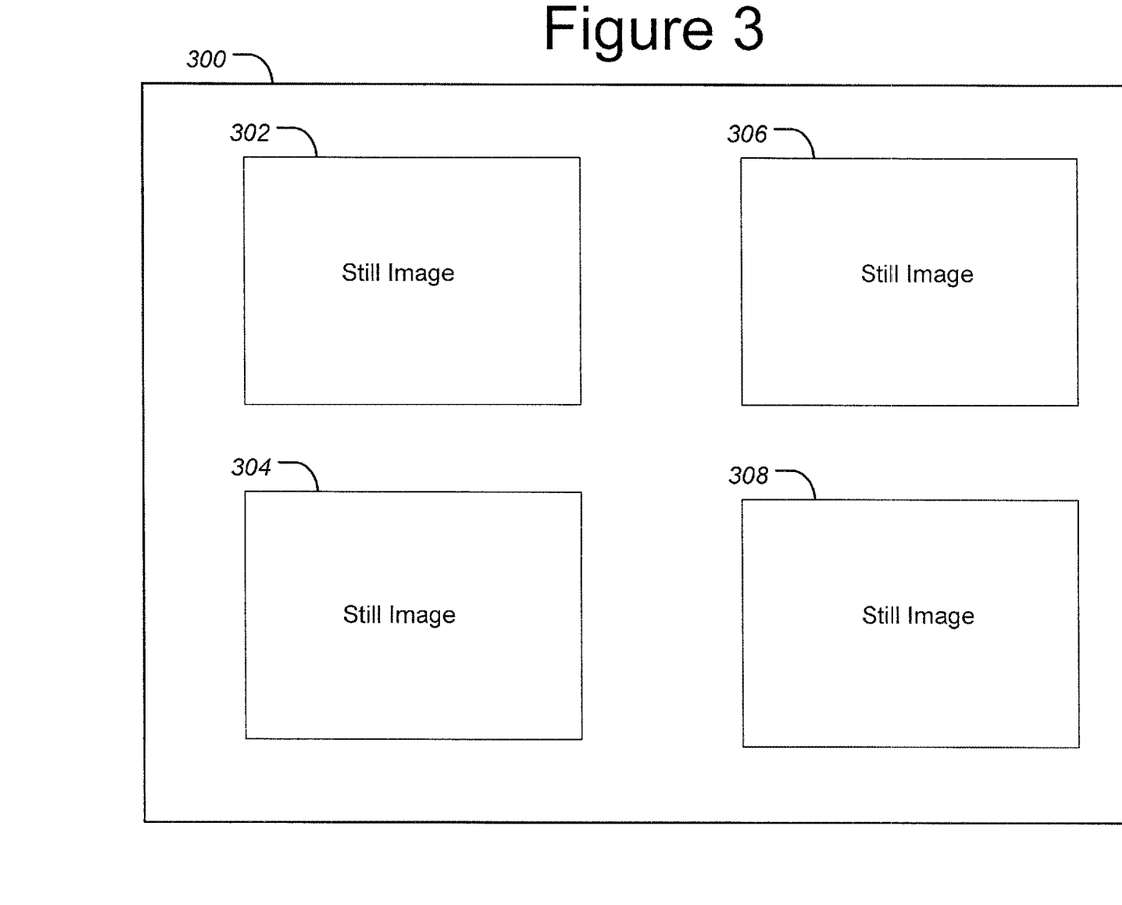
FIG. 3 depicts a screen view of static images in accordance with methods and systems consistent with the present invention.

FIG. 3 depicts a screen view of static images in accordance with methods and systems consistent with the present invention. FIG. 3 depicts a screen 300 connected to the client station computer 124 and shown to the user which includes various relatively static images at 302-308. The static images 302-308 may be still images or text or maybe relatively still images or text, and are received from the target computer 102. The user is able to view, manipulate and interact with these still images 302-308 remotely. A DVC encoder encodes the relatively static images.

Figure 4:
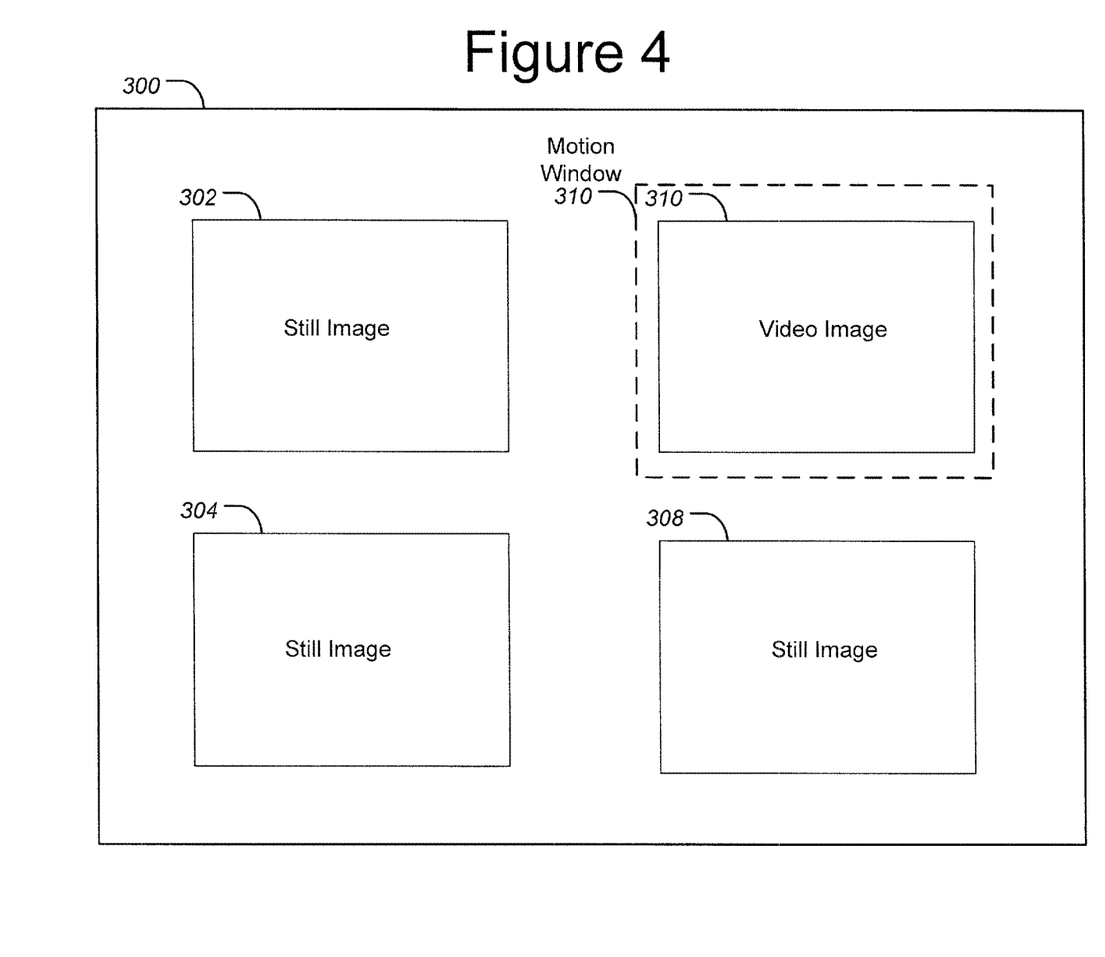
FIG. 4 depicts a screen view of static images and a video image in accordance with methods and systems consistent with the present invention.

FIG. 4 depicts a screen view of static images and a video image in accordance with methods and systems consistent with the present invention. FIG. 4 is similar to FIG. 3, except that one of the still images 308 has turned into a full motion video image 310. Upon detecting that this image or area of the screen 300 is moving at a rate more than a minimum motion threshold as set by the user or predetermined by the system, the system creates a motion window 312. Alternatively, the motion window 312 may also be created by the user by indicating the area of the screen with the mouse. This motion window 312 surrounds and encompasses the area of the full motion video. In one implementation, this motion window 312 is not necessarily rectangle, but encompasses the portion of the screen 300 that is moving. Within the motion window 312, an MPEG encoder (or other suitable motion video encoder) encodes the motion video, while outside of the motion window, the DVC encoder (or other suitable still image encoder) encodes the relatively static video, specifically avoiding encoding the motion window area. The DVC compression may also be implemented on a chip, and the DVC decompression may be done in software on the client. In one implementation, the video is encoded by an MPEG-4 compression chip. The system sends the encoded images to the client, and software on the client decodes the encoded images. The user is able to view, manipulate and interact with the still images 302-306 remotely, as well as the full motion video image 308. In one implementation, the viewer may be any viewer for MPEG such as Windows media player, or any other suitable viewer.

Figure 5:
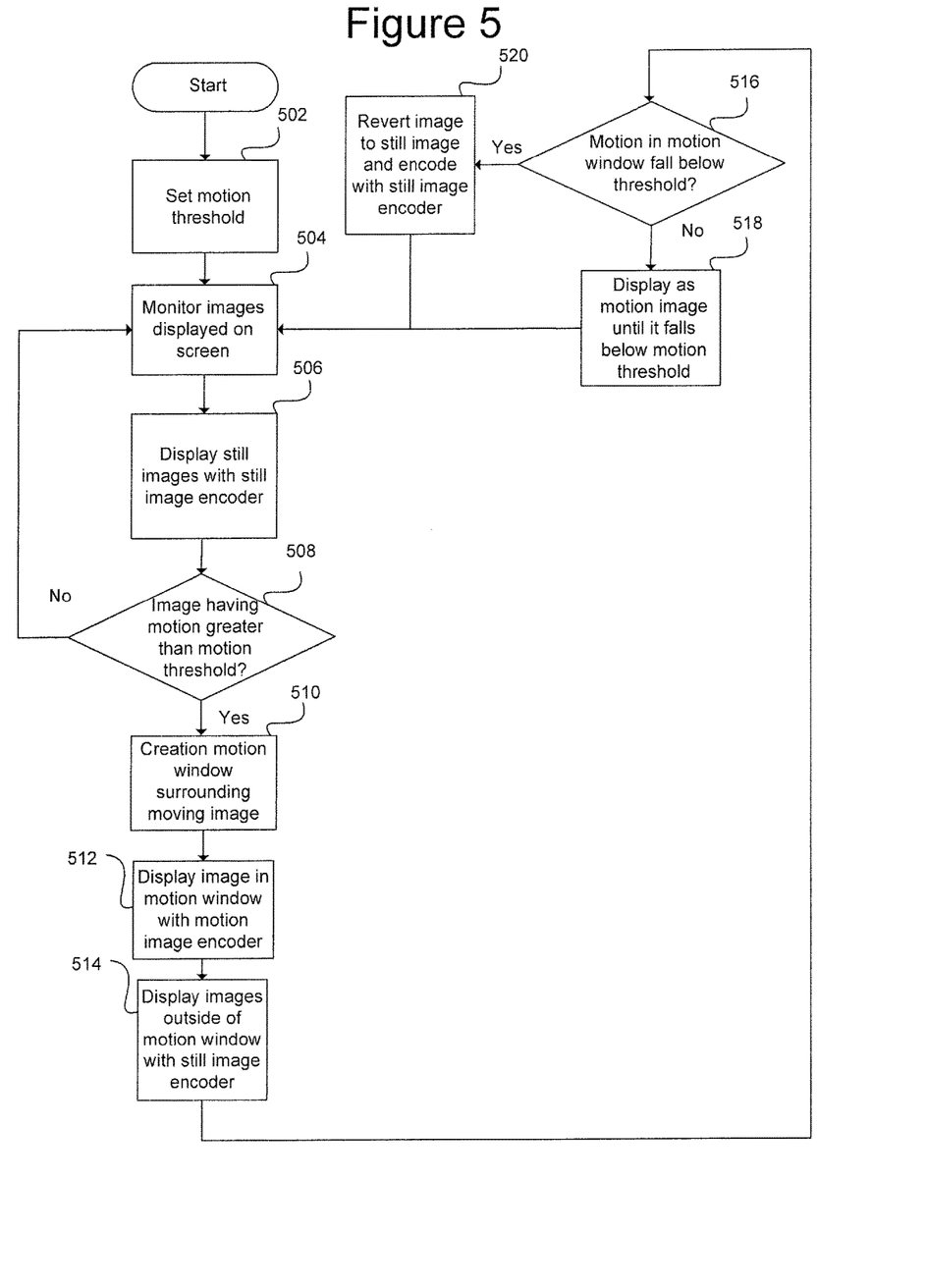
FIG. 5 illustrates steps in a method for remotely viewing static and moving images in accordance with methods and systems consistent with the present invention.

FIG. 5 illustrates steps in a method for remotely viewing static and moving images in accordance with methods and systems consistent with the present invention. First, the user or system sets a motion threshold above which it will be determined that an image is a motion video image (step 502). Below this motion threshold, it will be considered that the image is a relatively static image 302-306. The system then monitors the screen 300 and the images displayed on the screen to detect motion greater than the motion threshold (step 504). Relatively still images 302-306 are encoded with the DVC encoder and displayed on the screen 300 (step 506). If there is no motion greater than the motion threshold (step 508), the system continues to monitor the images (step 504) while displaying the still images 302-306 with the DVC encoder (step 506).

If the system determines that a portion of the screen 300 is moving greater than the motion threshold (step 508), a motion window 312 is created that surrounds the moving portion of the screen (step 510). The area in the motion window 312 is encoded with an MPEG encoder or any other suitable motion video encoder and displayed to the user (step 512). Meanwhile, the portion outside of the motion window 312 is encoded with the DVC encoder or other suitable still image encoder and displayed (step 514). The encoded images are sent to the client 124 which includes software that decodes the encoded images. The user is able to view the both the static and moving images.

The system monitors whether the motion in the motion window 312 falls below the motion threshold (step 516). If the motion falls below the motion threshold, it removes the motion window 312 and reverts the area to a relatively still image encoded by the DVC encoder (step 518). The system then continues to monitor the images on the screen 300 (step 504). If the motion in the motion window 312 does not fall below the motion threshold, the system continues to display the image with the MPEG encoder until it falls below the motion threshold (step 520). The system continues to monitor the images on the screen 300 to determine if any additional motion video is displayed and if any additional motion windows 312 are to be created (step 504).

The foregoing description of various embodiments provides illustration and description, but is not intended to be exhaustive or to limit the invention to the precise form disclosed. Modifications and variations are possible in light of the above teachings or may be acquired from practice in accordance with the present invention. It is to be understood that the invention is intended to cover various modifications and equivalent arrangements included within the spirit and scope of the appended claims.

What is claimed is:

1. A data processing system for remote viewing of still and motion images, comprising:
   a screen displaying images;
   a memory configured to store a motion threshold used to determine whether an image on the screen is one of: (1) a still image and (2) a motion image;
   a processor configured to:
      monitor the images displayed on the screen; and
      determine whether one or more of the images displayed on the screen are moving more than the motion threshold; and
   a motion video encoder configured to encode images on the screen that are moving more than the motion threshold; and
   a still image encoder configured to encode images on the screen that are moving less than the motion threshold while the motion video encoder encodes the images on the screen that are moving more than the motion threshold.

2. The data processing system of claim 1, further including:
   a still image decoder configured to decode images encoded by the still image encoder; and
   a motion video decoder configured to decode images encoded by the motion video encoder.

3. The data processing system of claim 1, further including:
   a client computer remotely controlling a target computer.

4. The data processing system of claim 1, further comprising an input for receiving the motion threshold from the user.

5. The data processing system of claim 1, wherein the still image encoder is a remote desktop encoder.

6. The data processing system of claim 5 wherein the remote desktop encoder is one of: (1) a DVC encoder, (2) an RDP encoder, and (3) a VNC encoder.

7. The data processing system of claim 1, wherein the motion video encoder is an MPEG encoder.

8. The data processing system of claim 1, further including one or more motion windows surrounding one or more images that are moving more than the motion threshold.

9. The data processing system of claim 8, wherein the processor is further configured to monitor the one or more motion windows and to determine if the motion in one or more of the monitored motion windows falls below the motion threshold.

10. The data processing system of claim 8, wherein the processor is further configured to process one or more monitored motion windows that fall below the motion threshold as a still image, and wherein the still image encoder is configured to display the one or more monitored motion windows that fall below the motion threshold.

11. A method in a data processing system for remote viewing of still images and motion images, comprising:
   displaying a screen having images;
   storing a motion threshold used to determine whether an image on the screen is one of: (1) a still image and (2) a motion image;
   monitoring the images displayed on the screen;
   determining whether one or more of the images displayed on the screen are moving more than the motion threshold;
   encoding images on the screen that are moving more than the motion threshold with a motion image encoder; and
   encoding images on the screen that are not moving less than the motion threshold with a still image encoder while encoding the encoding images on the screen that are moving more than the motion threshold with the motion image encoder.

12. The method of claim 11, further including displaying the encoded images.

13. The method of claim 11, further including creating one or more motion windows surrounding one or more images that are moving more than the motion threshold.

14. The method of claim 11, further including:
   decoding the images encoded by the still image encoder; and
   decoding the images encoded by the motion image encoder.

15. The method of claim 11, further including:
   remotely controlling a target computer with a client computer.

16. The method of claim 11, further comprising: receiving the motion threshold from a user.

17. The method of claim 11, wherein the still image encoder is a remote desktop encoder.

18. The method of claim 11, wherein the remote desktop encoder is one of: (1) a DVC encoder, (2) an RDP encoder, and (3) a VNC encoder.

19. The method of claim 11, wherein the motion video encoder is an MPEG encoder.

20. The method of claim 11, further comprising:
   monitoring the one or more motion windows to determine if the motion in one or more of the monitored motion windows falls below the motion threshold.

21. The method of claim 20, further comprising:
   encoding one or more monitored motion windows that fall below the motion threshold with the still image encoder.

* * * * *